March 31, 1942.   J. X. PHILLIPS   2,277,830
TRANSMISSION SHIFTING MECHANISM
Filed Jan. 18, 1938   2 Sheets-Sheet 1
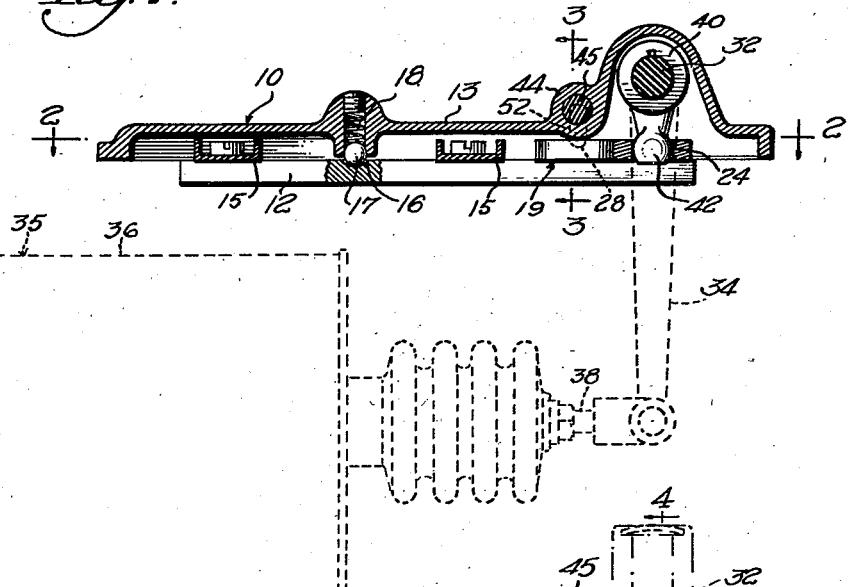
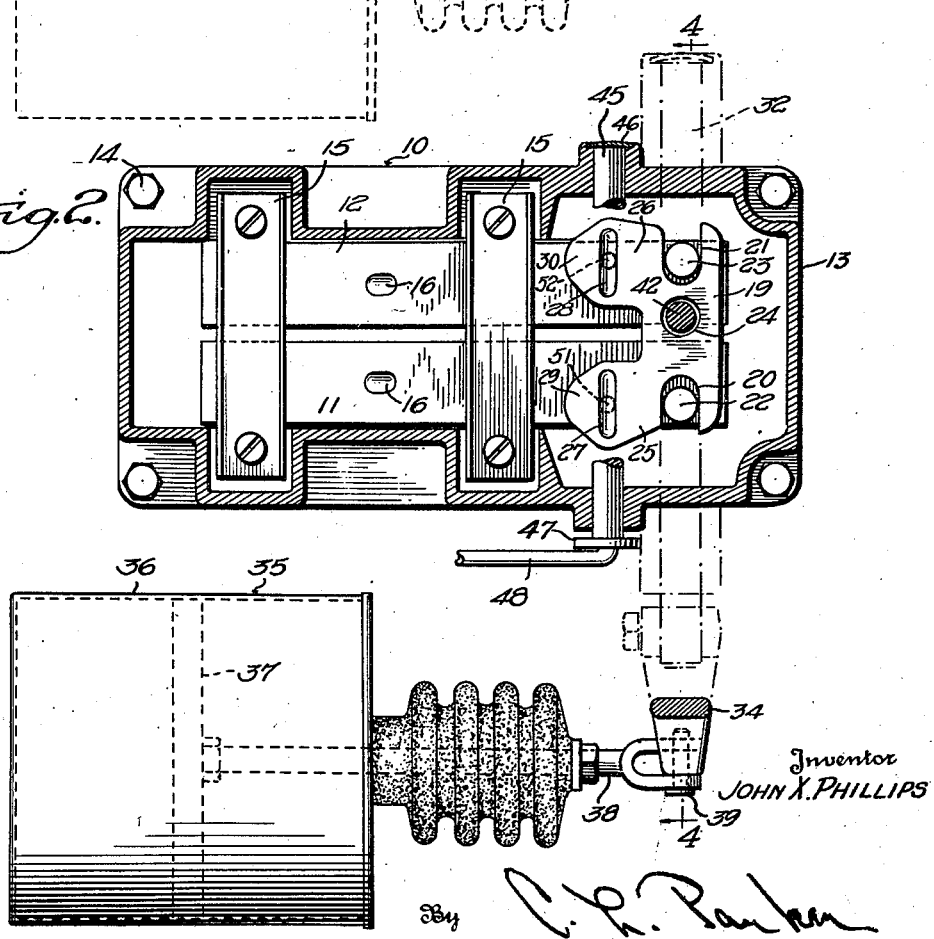
Inventor
JOHN X. PHILLIPS March 31, 1942.        J. X. PHILLIPS        2,277,830
TRANSMISSION SHIFTING MECHANISM
Filed Jan. 18, 1938        2 Sheets-Sheet 2
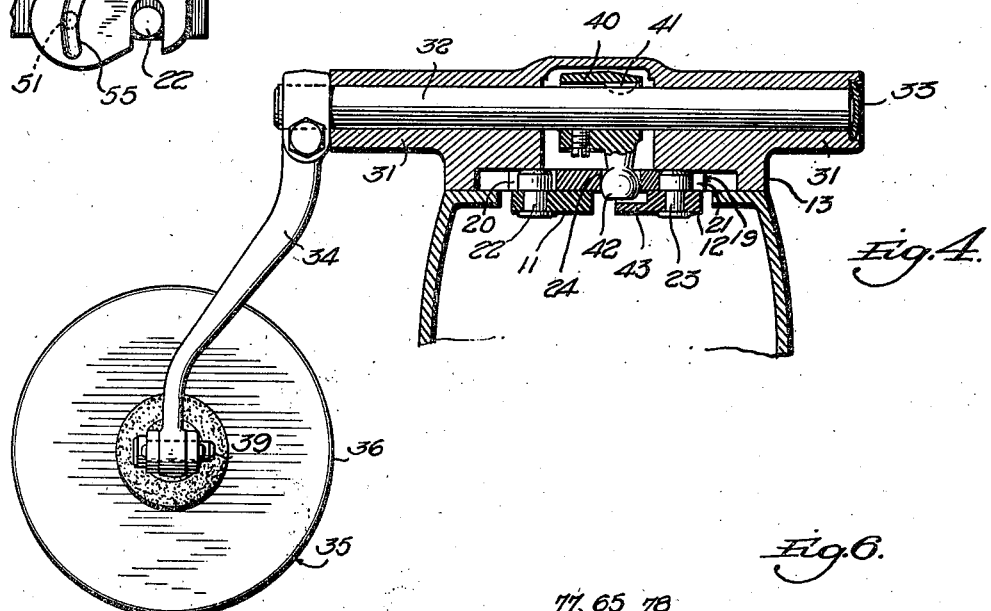
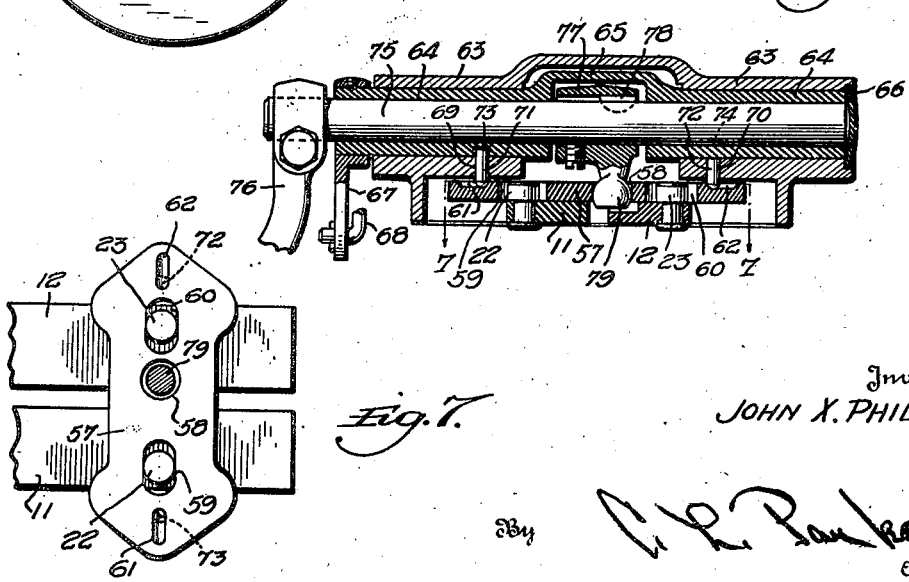
Inventor
JOHN X. PHILLIPS Patented Mar. 31, 1942

2,277,830

UNITED STATES PATENT OFFICE 2,277,830

TRANSMISSION SHIFTING MECHANISM

John X. Phillips, Vienna, Va., assignor to Automatic Shifters, Inc., Richmond, Va., a corporation of Virginia Application January 18, 1938, Serial No. 185,586

11 Claims. (Cl. 74—473)

This invention relates to transmission shifting mechanisms, and more particularly to a mechanism for controlling and operating the shift rails of a motor vehicle transmission.

It has been the common practice to provide motor vehicles, and particularly passenger vehicles, with transmissions having gear changes controlled by two longitudinally slidable shift rails. Each of such rails is slidable in opposite directions from a neutral position and the shift rail which is not being operated is maintained in neutral position in most transmissions by means of spring pressed detents. Selection of the shift rails and actuation thereof are controlled in conventional shifting mechanisms by a manually operable gear shift lever which is movable transversely to select the shift rail for operation and longitudinally for actuating the selected rail.

A number of different types of power operated mechanisms for selecting and actuating the shift rails have been developed in recent years. Most of such mechanisms require the use of two power devices controlled by a manually operable handle, one power device being operable for selecting a shift rail for operation and the other power device being operable for actuating the selected shift rail. Most of the mechanisms of this general type have been provided with fluid pressure operated power devices, each of which requires a control valve mechanism, and both of such mechanisms have been operated by a manually operable lever.

In the copending application of John A. Lawler, Serial No. 161,318, filed August 27, 1937, there has been shown and described a mechanism, particularly intended for use with power operated shifting devices, wherein selection of the shift rails for operation is accomplished by novel means which is operable with so little effort as to permit the elimination of the usual crossover motor or other power device for selecting the shift rails for operation. With the mechanism of the copending application, therefore, the power shifting apparatus as a whole may be greatly simplified for the reason that only one power device and its control means is required, the selection of the shift rails being accomplished manually by the operator.

In the mechanism of the copending application, power is applied to effect movement of either shift rail through the medium of a whiffletree lever connected to both shift rails and having means for applying a force centrally of the lever. The shift rail which will be actuated is dependent upon the operation of the novel selecting means which comprises a rock shaft movable between two operative positions and adapted in each position to engage a locking member with one of the shift rails to prevent the operation thereof. The other shift rail will then be actuated upon the application of force to the whiffletree lever.

The locking means employed in connection with the rock shaft of the copending application referred to is in the form of a pair of vertically movable pins or similar elements each of which is engageable with an upwardly facing notch formed in the associated shift rail. Such mechanism, therefore, requires that each shift rail be transversely milled or similarly worked upon to provide a notch to receive the associated locking member. In order to eliminate excessive wear of the notches it has been found necessary to harden each shift rail adjacent its notch.

An important object of the present invention is to provide a mechanism of the general type shown in the copending application referred to which possesses all of the advantages of such mechanism without the disadvantages thereof referred to above. More specifically an important object of the present invention is to provide a mechanism having all of the advantages of the mechanism of the copending application referred to without the necessity of milling or otherwise providing notches in the shift rails and consequently eliminating also the necessity of hardening any part of either shift rail.

A further object is to embody with the whiffletree lever the means for selecting the shift rails for operation thus permitting the selecting and shifting operations to be carried out through the medium of a single element, namely, the whiffletree lever, without the necessity of having to alter the shift rails in any way.

A further object is to provide rock shaft means for selecting the shift rails for operation and to provide means under the control of the rock shaft for engaging either end of the whiffletree lever to anchor the latter and thus permit movement of the opposite end of the whiffletree lever to actuate the associated shift rail.

A further object is to provide a mechanism of the character referred to wherein the notches which are selectively engageable with the selective locking means are formed directly in the whiffletree lever thus permitting such lever to perform both the selecting and actuating functions for the shift rails.

Other objects and advantages of the invention will become apparent during the course of the following description.

In the drawings I have shown two embodiments of the invention. In this showing:

Figure 1 is a central vertical sectional view through the cover plate of a transmission, and associated parts, the power actuating means being shown in broken lines, Figure 2 is a horizontal sectional view taken substantially on line 2—2 of Figure 1, a portion of the selecting shaft being broken away, Figure 3 is a transverse vertical sectional view on line 3—3 of Figure 1, Figure 4, is a similar view on line 4—4 of Figure 2, Figure 5 is a fragmentary horizontal sectional view taken on the same plane as Figure 2 showing a slightly modified form of whiffletree lever, Figure 6 is a fragmentary sectional view similar to Figure 4 showing a modified form of the invention, and, Figure 7 is a fragmentary horizontal sectional view on line 7—7 of Figure 6.

Referring to Figures 1 to 4, inclusive, the numeral 10 designates a motor vehicle transmission as a whole the gear elements of which may be conventional and are not shown. Shifting of the gears is accomplished by effecting longitudinal movement of either of a pair of shift rails 11 or 12 connected to the gear elements in the usual manner. Each of these shift rails is movable in opposite directions from the neutral positions shown in Figures 1 and 2, the shift rail 11 being movable in opposite directions to provide low and reverse gears and the shift rail 12 being similarly movable to provide second and high gears.

A cover plate 13 is arranged over the transmission casing and is secured thereto in the usual manner by screws or bolts 14. The cover plate carries guide bars 15 for the shift rails in the usual manner. Each shift rail is provided with a recess 16 to receive a ball 17 urged downwardly by a spring 18, the balls 17 acting as detents to tend to retain the shift rails in neutral position. This arrangement is conventional except that each of the notches 16 is preferably slightly elongated longitudinally of its associated shift rail for a purpose to be described.

Adjacent one end of the transmission a whiffletree lever 19 is arranged over the shift rails as shown in Figures 1 and 2, this lever being provided in opposite ends thereof with elongated notches 20 and 21 to respectively receive upstanding pins 22 and 23 carried by the respective shift rails 11 and 12. The notches 20 and 21 are in alignment with each other as shown in Figure 2 and in alignment with an opening 24 formed in the lever 19, this opening being offset to one side of a center line extending between the shift rails for a purpose to be described.

The lever 19 has spaced portions 25 and 26 extending rearwardly or to the left longitudinally of the transmission as shown in Figure 2, and these extended portions of the lever are respectively provided in their upper faces with aligned grooves 27 and 28 extending transversely of the transmission. These grooves may be straight as shown in Figure 2. The lever 19 is extended rearwardly beyond the grooves 27 and 28 as at 29 and 30 respectively, for a purpose to be described.

In the transverse plane of the lever notches 20 and 21 the cover plate is provided with a pair of aligned bearings 31 spaced above the shift rails and having their inner ends spaced as shown in Figure 4, for a purpose to be described. A shaft 32 is mounted to rock in the bearings 31 and may extend from the outer end of either bearing. The outer end of the other bearing is preferably capped as at 33. The extended end of the shaft 32 may be provided with a crank 34. Any suitable means may be provided for operating the crank 34 and in the drawings a differential fluid pressure motor 35 has been shown, this motor having a cylinder 36 provided with a piston 37 connected to a piston rod 38 the outer end of which is connected as at 39 to the lower end of the crank 34.

In the space between the bearings 31, a collar 40 surrounds the shaft 32 and is keyed thereto as at 41. The collar 40 carries a depending crank 42 the lower end of which is preferably spherical and is arranged in the opening 24. The opening 24 is offset to one side of the center of the transmission, as stated, and accordingly the crank 42 is similarly offset. Accordingly the shift rail 12 is preferably notched as at 43 to provide space for the lower end of the crank 42. It will be apparent that upon rocking movement of the shaft 32, the crank 42 will apply a force to the whiffletree lever 19, thus tending to move both of the pins 22 and 23 (Figure 2) and their associated shift rails.

The cover plate 13 is provided with a bearing 44 offset rearwardly from and lower than the bearing 31, as shown in Figure 1. This bearing carries a rock shaft 45 which may project from either end of the bearing 44, the other end of this bearing preferably being capped as at 46. The projecting end of the shaft 45 is provided with a crank 47 to the lower end of which is connected an operating rod 48 through the medium of which the shaft 45 may be rocked for a purpose to be described.

When the shift rails are in the neutral position shown in Figure 2, the grooves 27 and 28 lie in the vertical plane of the shaft 45, and in the same plane, the bottom of the bearing 44 is provided with a pair of openings 49 and 50 receiving vertically slidable pins 51 and 52 respectively. The lower ends of the pins 51 and 52 are respectively engageable in the grooves 27 and 28.

The shaft 45 is provided with circumferentially offset openings 53 and 54 for selectively receiving the pins 51 and 52, depending upon the position of the shaft 45. This shaft is adapted to be rocked between two operative positions in one of which the opening 53 is in engagement with its pin 51 and in the other of which the opening 54 is in alignment with its pin 52. Therefore, in either position of the shaft 45, one of the pins 51 or 52 will engage a peripheral portion of the shaft and thus will be locked in its associated groove 27 or 28. Accordingly it will be apparent that when force is applied to the lever 19 by the crank 42, the pin 51 or 52 which is locked in its associated groove will prevent the lever 19 from transmitting force to the corresponding shift rail, and accordingly the other shift rail will be actuated.

As previously stated, the notches 16 (Figures 1 and 2) are preferably slightly elongated longitudinally of the shift rails. In this connection it will be apparent that actuation of the lever 19 will cause it to swing about one of the pins 51 or 52, and this operation develops a slight component of movement of the associated notch 21 or 22 longitudinally of the transmission. This component of movement is mostly taken up by virtue of the slight play provided between the pins 22 and 23 and their associated notches 20 and 21. Any slight movement actually transmitted to the shift rail corresponding to the locking pin which is in operation is permitted to take place relatively freely by elongating the notches 16. This movement, however, will not be sufficient to move the associated shift rail out of neutral position.

The slight movement of the shift rail which is not selected for operation may be compensated for in the design of the lever 19 in the manner shown in Figure 5. This lever is identical with the lever previously described except for the shape of the locking grooves. Accordingly this lever and all of the parts thereof except the locking grooves have been designated by the same numerals as the form of the lever previously described. In Figure 5, the lever 19 is provided with locking grooves 55 and 56 the outer ends of which curve slightly in the direction of the pins 22 and 23. The inner ends of these grooves curve in the same direction to a slightly greater extent. The reason for the slightly different curvature of the ends of the grooves 55 and 56 will be referred to later.

In the form of the invention shown in Figures 6 and 7, the two rocking members which respectively select and actuate the shift rails are mounted concentric with each other. In such form of the invention, a whiffletree lever 57 is employed, and this lever is substantially of the form shown in Figure 7. The lever is provided intermediate its ends with an opening 58 for the reception of a crank to be described. Outwardly of the opening 58, the lever is provided with slots 59 and 60 for the reception of the pins 22 and 23 previously described. Beyond the slots 59 and 60, the lever is provided with locking grooves 61 and 62 to receive locking elements to be described.

Referring to Figure 6, the transmission cover plate is provided with aligned spaced bearings 63 corresponding generally in position to the bearings 31 previously described except that they are somewhat larger, and the inner ends of the bearings 63 likewise are spaced from each other. The bearings 63 are provided with sleeves 64 having their adjacent ends spaced from each other and rigidly connected by a preferably integral yoke member 65. One of the sleeves 64 projects from the outer end of its associated bearings 63 and the outer end of the other bearing 63 may be capped as at 66. The projecting sleeve 64 is provided with an operating crank 67 to which is connected an operating rod 68 through the operation of which the sleeves 64 may be locked in their bearings.

When the shift rails are in the neutral position shown in Figure 7, the grooves 61 and 62 lie in the vertical plane of the axis of the sleeves 64, and in the same plane, the bottoms of the bearings 63 are provided with openings 69 and 70 slidably receiving locking pins 71 and 72. The lower ends of these pins are respectively engageable in the grooves 61 and 62. In order to respectively lock and unlock the pins 71 and 72, as shown in the form of the invention previously described, the sleeves 64 are respectively provided with circumferentially offset openings 73 and 74. Accordingly, depending upon the position of the sleeves 64, one of the locking pins is freely movable upwardly out of its groove 61 or 62 while the other locking pin is locked in its corresponding groove to fix the corresponding end of the whiffletree lever 57 against movement.

The sleeves 64 receive a rock shaft 75 provided at one end with an operating crank 76 corresponding to the crank 34 previously described. Between the inner ends of the sleeves 64, a collar 77 is keyed to the shaft 74 as at 78, and this collar carries a depending crank 79, the lower end of which is spherical and is arranged in the opening 58.

The operation of the form of the invention shown in Figures 1 to 4, inclusive, is as follows:

In a conventional transmission, shifting of the gears is accomplished by moving the gear shift lever laterally to engage the lower end of the latter with either shift rail, and then longitudinally to effect movement of the selected shift rail. The same functions are performed in most mechanical shifting mechanisms by operating a crossover or selecting motor to engage an actuating element with either shift rail, whereupon the shifting motor may be energized to shift the selected rail. Mechanisms of this character require sufficient force in operating the selecting devices to render it impracticable to manually select the shift rails by the operation of the miniature manual levers usually provided.

With the present construction, the selecting of the shift rails is accomplished against a minimum amount of resistance thus rendering it wholly practicable to transmit manual force from a small control lever for effecting the selecting operation. While the present device is not limited to the manual selection of the shift rails, the characteristics of the mechanism are such as to render manual selection wholly practicable. Assuming that the shift rails are in the neutral position shown in Figure 2, the rod 48 may be operated to rock the shaft 45 and thus turn one or the other of the openings 53 or 54 (Figure 3) out of alignment with its respective locking pin. Assuming that the gear set is in neutral and it is desired to shift into low gear, the shaft 45 will be turned to the position shown in Figure 3.

With the shaft 45 in the position stated, the pin 51 is free to move upwardly out of engagement with the groove 27, this groove and the lower end of the pin 51 being curved to facilitate upward movement of the pin out of its groove upon actuation of the whiffletree 19 in a manner to be described. With the shaft 45 in the position stated, however, the pin 52 will be positively fixed against upward movement since the upper end of the pin will contact with a circumferential portion of the shaft 45. Thus one end of the whiffletree lever will be positively fixed against movement and such end of the lever therefore cannot transmit movement to the associated shift rail.

With the pin 51 in alignment with the opening 53 the shift rail 11 will be selected for actuation. Such selection having been made, the motor 35 may be energized either by admitting fluid pressure into the left hand end of the cylinder 36 as viewed in Figure 2 or by exhausting air from the right hand end thereof, under which conditions the piston 37 will move toward the last named end of the cylinder 36 and the crank 34 will be turned in a counterclockwise direction as viewed in Figure 1.

This action causes the crank 42 to turn in a counterclockwise direction and its movement will be imparted to the lever 19 to move the center of this lever forwardly or to the right as viewed in Figure 2. Since the pin 52 will be locked in its groove 28, movement of the whiffletree lever in the manner stated will cause this lever to swing whereby motion will be imparted to the pin 22 to move the shift rail 11 forwardly or to the right as viewed in Figure 2. Since the pin 51 is free to move upwardly movement of the whiffletree in the manner stated cams the pin 51 upwardly into its opening 53 and during movement of the lever 19, the lower end of the pin 51 will rest upon the extended portion 29 of the lever.

During movement of the lever 19 in the manner described, the crank 42 moves toward the right as viewed in Figure 2, thus increasing the distance between the crank 42 and the pin 52. Thus the groove 28 slides inwardly with respect to the pin 52 during the shifting operation referred to. At the same time, the distance between the crank 42 and pin 23 increases and accordingly the pin 23 moves relatively outwardly in the notch 21. The pin 52 acts as a pivot pin for the lever 19 during the shifting operation referred to and the movement described continues until the low gear position is reached.

During the shifting operation described, the distance between the pin 23 and the groove 28 on a line parallel to the shift rails increases and it is necessary that this increase in distance be compensated for. The action referred to tends to impart movement to the pin 23 but since this movement is extremely slight, the slot 21 may be made slightly wider than the diameter of the pin 23 to provide sufficient play to compensate for the movement described. If desired, the play between the pin 23 and its notch 21 may be minimized and the notch 16 may be slightly elongated to permit the shift rail 12 to partake of slight movement so as to prevent any tendency of the parts to bind.

The change in distance between either of the pins 22 and 23 and its corresponding locking groove on lines parallel to the shift rails occurs with each shifting operation and is compensated for in the same manner. In other words, both of the pins 22 and 23 preferably are provided with sufficient play for the purpose stated, and both notches 16 may be slightly elongated. However, any movement which will be transmitted to the shift rail which is not selected for operation will be negligible.

After the vehicle has attained sufficient momentum in low gear, the operation of the motor 35 is reversed to return the parts to neutral position at which point the rod 48 will be operated to turn the selecting shaft 45 to its other position. It will be apparent that when the shift rail 11 is returned to neutral position the lower end of the pin 51 will drop into the groove 27 whereupon the shaft 45 will be free to turn and may be rocked with no resistance against such movement except for the slight friction of the shaft 45 in its bearing. It is this extremely limited resistance to the turning movement of the shaft 45 which renders the operation of the selecting means entirely practicable through the operation of a relatively small manual lever.

The shaft 45 having been turned to its second position, it will be apparent that the opening 53 (Figure 3) will be turned out of alignment with the pin 51 while the opening 54 will be arranged in alignment with its pin 52 ready to receive the latter upon upward movement thereof. The pin 51 will have its upper end engaged with a circumferential portion of the shaft 45 and accordingly the corresponding end of the lever 19 will be locked against movement.

Under the conditions referred to the shift rail 12 will be selected for operation and upon energization of the motor 35 the actuating shaft 32 will be rocked in a clockwise direction. The crank 42 will then transmit a force to the lever 19 to swing the latter rearwardly about the pin 51 acting as a pivot for the lever. Accordingly the lever 19 will actuate the shift rail 12 through the pin 23 and the shift rail 12 will move toward the left as viewed in Figure 2 to the second gear position.

After the vehicle has attained sufficient momentum in second gear the shift may be made into high gear, and since the latter gear is also controlled by the shift rail 12, the selecting mechanism will not be operated and the end of the lever 19 corresponding to the shift rail 12 will be free to move. Accordingly it merely is necessary to energize the motor 35 to swing the shaft 32 in a counter-clockwise direction to swing the crank 42 in a corresponding direction, whereupon the parts will be moved to neutral position and then on into high gear position. When the parts pass through neutral position, the pin 52 will drop into its groove 28 and will be immediately cammed out of the groove to slide over the upper face of the lever 19. The upper faces of the lever 19 adjacent both edges of both grooves 27 and 28 are adapted to support the respective pins 51 and 52 when they are unlocked.

It will be obvious that the shift may be made into reverse gear by placing the shaft 45 in the same position as described above for low gear. The motor 35, however, will be operated to move the piston 37 toward the left instead of toward the right, in which case the shift rail 11 will be moved toward the left as viewed in Figure 2 to place the gear set in reverse gear.

The whiffletree lever shown in Figure 5 may be employed to compensate for the effect of the swinging movement of the lever 19 previously referred to. By curving the ends of the grooves 55 and 56, any portion of either groove in which the corresponding locking pin is arranged will remain the same distance from the corresponding shift pin 22 or 23, thus preventing the transmission of even a slight movement to either transmission pin.

As previously stated the adjacent ends of the locking grooves 55 and 56 are slightly more sharply curved than the remote ends of these grooves. It will be apparent that as the crank 42 moves to the right as shown in Figure 5, with the pin 52 locked, the pins 23 and 52 move relatively toward the same ends of their notch 21 and groove 56. If the pin 23 remained in the same position in its notch 21, the groove 56 would be curved on an arc of a circle with its center at the center of the pin 23. Since this pin moves outwardly, however, the arc of curvature of the groove 56 is generated with respect to the moving center of the pin 23. The same thing is true with respect to the pin 22 and the outer end of the groove 55 when the pin 51 is locked in position.

The curvatures of the adjacent ends of the grooves 55 and 56 are similarly generated. However, with either pin 51 or 52 locked, and with the crank 42 moving toward the left as viewed in Figure 5, the operative locking pin will move relatively toward the inner end of its groove while the corresponding shifting pin will move relatively toward the outer end of its notch. Therefore, it will be apparent that the curvatures of the adjacent ends of the locking grooves must be generated with respect to the outwardly moving centers of the corresponding shifting pins, and thus the inner ends of the locking grooves will be more sharply curved. The curvatures of the grooves are substantially exaggerated in Figure 5 for the purpose of illustration. The curved grooves may be employed if desired, but it is preferred to employ the straight grooves as shown in Figure 2 for the reason that these grooves may be more easily milled.

The operation of the form of the invention shown in Figures 6 and 7 is quite similar to the form shown in Figures 1 to 4, inclusive, and need not be referred to in detail.

The sleeve elements 64 are locked in the same manner and perform the same functions as the shaft 45, either pin 71 or 72 being locked in engagement with its corresponding groove 61 or 62 to anchor the adjacent end of the lever 57 whereby this lever has its other end free to move the corresponding shift rail. In such form of the invention it is desirable to locate the pins 71 and 72 as close as possible to the outer ends of the slots 59 and 60 to minimize movement of the shifting pin 22 or 23 adjacent the locking pin which is locked in operative position. The movement of the shifting pin adjacent the operative locking pin is so slight as not to cause substantial movement of the associated shift rail, and these rails also may be provided with elongated notches 16 (Figures 1 and 2) to minimize undue resistance to the turning movement of the lever 57.

The form of the invention shown in Figures 6 and 7 is advantageous for the reason that it arranges concentric with each other the locking elements which control the selection and operation of the shift rails, thus eliminating the offsetting of these elements as in Figure 2.

The opening 24 (Figure 2) and the opening 53 (Figure 7) should be arranged closer to the shift rail 12 with certain types of transmissions. It is the common practice to provide the second and high gear elements of a transmission with gear synchronizing means with the result that the corresponding shift rail moves a shorter distance than the low and reverse gear shift rail. The operating cranks of the actuating shafts accordingly may be offset whereby a given swinging movement of either actuating shaft will move the shift rail 11 to a greater extent than the shift rail 12 to compensate for the difference in the movements of these rails to provide their respective gear ratios.

It will be apparent that either form of the invention is such as to permit selection of the shift rails with a minimum expenditure of force, thus rendering it practical to perform the selecting operation by the direct manual operation of a relatively small control lever. Very little frictional resistance is encountered in the selecting operation, there being no sliding of the parts with high frictional resistances. Moreover, there are no spring pressed or similar parts which must be moved during the selecting operation. The pins 51 and 52 are adapted to drop by gravity to their operative positions without requiring any force from the shaft 45, although the openings for receiving the locking pins may be constructed to positively move the locking pins downwardly in the event these elements stick in position. Such a construction is shown in the copending application of John A. Lawler, referred to above.

It will be apparent that the selecting means cannot be turned except when both shift rails are in neutral position. For example, if the shift rail 11 is moved with the parts in the position shown in Figure 3, the pin 51 will enter the opening 53, thus locking the shaft 45, and this shaft cannot be turned until the shift rail 11 has been returned to neutral position and upon downward movement of the pin 51. Any suitable means may be employed for limiting the turning movement of the shaft 45 or sleeves 64 to define the operative positions of these elements referred to.

The present invention is intended for use with a conventional transmission, or it may be used with a so-called "rolled over" transmission wherein the shift rails are arranged in a vertical plane. In other words, some transmissions are now turned 90° from the position shown to permit the lowering of the floor boards without the use of so-called "tunnels" therein. With a rolled over transmission the locking pins obviously cannot move to operative positions by gravity, and accordingly it is necessary for the pin receiving openings to be cut tangentially or in some similar manner whereby they will cam the pins to locking position. This feature is disclosed in the copending application of John A. Lawler referred to above and forms no part of the present invention.

In the copending application referred to one end of the whiffletree lever is indirectly locked by locking the corresponding shift rail. As previously stated, this arrangement necessitates the cutting of the shift rails to receive the locking pins and the rails must be separately hardened adjacent the pin receiving openings to minimize wear. The present construction is highly advantageous over the construction referred to for the reason that it concentrates the selecting and actuating means with respect to a single element, namely, the whiffletree lever. Accordingly, it is unnecessary to cut the pin receiving openings or recesses in the shift rails and it likewise is unnecessary to harden any portions of the shift rails. Both of the pin receiving grooves in the present construction are formed in the whiffletree lever and accordingly only this single element need be hardened to minimize wearing of the locking pins against their respective locking grooves. This is true of each of the forms of the invention illustrated, and as a further advantage attention is invited to the fact that the concentrating of the controlling and acuating means facilitates the installation of the device. In this connection it is pointed out that in many motor car structures it is quite difficult, because of limited space, to locate the selecting and actuating means and this problem is greatly simplified by the arrangement of the selecting and actuating means close to each other. The use of the whiffletree lever both for selecting and actuating the shift rails also provides a construction which may be more cheaply manufactured.

It is to be understood that the forms of the invention herewith shown and described are to be taken as preferred examples of the same and that various changes in the shape, size and arrangement of parts may be resorted to without departing from the spirit of the invention or the scope of the subjoined claims.

I claim:

1. The combination with a transmission having a plurality of members shiftable to provide different gear ratios, of floating lever means connected to all of said shiftable members, and selectively operable means having portions engageable with said lever means at different points to pivot said lever means at such different points to render it effective for moving different shiftable members, and means independent of said selectively operable means for operating said floating lever.

2. The combination with a transmission having a plurality of members shiftable to provide different gear ratios, a floating lever connected to all of said shiftable members, a pair of rocking members, means connecting one rocking member to said floating lever to actuate it, and means directly engageable with said lever and controlled by the other rocking member to render said lever effective for moving only one of said shiftable members at a time.

3. The combination with a transmission having a plurality of members shiftable for providing different gear ratios, of an actuating lever operable for moving said shiftable members, and a plurality of pivot members movable parallel to each other and at right angles to said actuating lever and directly selectively engageable therewith to determine the pivot axis thereof to render said actuating lever selectively effective for moving only one of said shiftable members.

4. The combination with a transmission having a plurality of members shiftable for providing different gear ratios, of an actuating lever operable for moving said shiftable members, a plurality of pivot members movable parallel to each other and at right angles to said actuating lever and directly selectively engageable therewith to determine the pivot axis thereof to render said actuating lever selectively effective for moving only one of said shiftable members, and means for selecting said pivot members for operation comprising a rocking member mounted to rock between a plurality of positions and operative in each position for engaging one of said pivot members with said lever.

5. The combination with a transmission having a pair of members shiftable for providing different gear ratios, of a floating lever having end portions engageable with both of said shiftable members, means for applying a force to said lever intermediate its ends, a pivot member engageable and disengageable with each end of said lever to render the other end thereof effective for moving its associated shiftable member, and a rock shaft having circumferential portions engageable with said pivot members to hold them in engagement with said lever and provided with angularly spaced portions selectively movable into coinciding relationship with said pivot members to selectively release them from said lever.

6. The combination with a transmission having a pair of members shiftable in opposite directions from neutral position for providing different gear ratios, of an actuating lever connected at given points to said shiftable members, a plurality of pivot members directly engageable with said lever to determine the pivot axis thereof to render said lever selectively effective for moving only one of said shiftable members, said pivot members being engageable with said lever at points lying in a plane transverse to said shiftable members and in the plane of the points of connection of said lever with said shiftable members when the latter are in neutral position, and means for controlling said pivot members.

7. The combination with a transmission having a pair of members shiftable in opposite directions from neutral position for providing different gear ratios, of an actuating lever connected at given points to said shiftable members, a plurality of pivot members directly engageable with said lever to determine the pivot axis thereof to render said lever selectively effective for moving only one of said shiftable members, said pivot members being engageable with said lever at points lying in a plane transverse to said shiftable members and in the plane of the points of connection of said lever with said shiftable members when the latter are in neutral position, and means for selecting said pivot members for operation comprising a rocking member mounted to rock between two operative positions and operative in each position for engaging one of said pivot members with said lever.

8. The combination with a transmission having a pair of members shiftable in opposite directions from neutral position for providing different gear ratios, of a floating lever having slotted connection with both of said shiftable members at points lying in a plane transverse to said shiftable members when the latter are in neutral position, means for applying a force to said lever intermediate its ends, a pivot member engageable with each end of said lever outwardly of the connection of said lever with the associated shiftable member to render the other end of said lever effective for moving its associated shiftable member, said pivot members lying in said plane when said shiftable members are in neutral position, and means for selectively engaging said pivot members with said lever.

9. The combination with a transmission having a plurality of members shiftable into different transmission setting positions, of a floating lever having engagement with all of said members, selecting means operable for rendering said floating lever effective for moving only one of said members, and operating means for applying a force to said floating lever to actuate the selected member, said two means comprising a pair of rocking members one of which is a shaft and the other of which is a sleeve surrounding said shaft.

10. The combination with a transmission having a pair of members shiftable in opposite directions from neutral position for providing different gear ratios, of a floating lever having slotted connection with both of said shiftable members at points lying in a plane transverse to said shiftable members when the latter are in neutral position, means for applying a force to said lever intermediate its ends, a pivot member engageable with each end of said lever outwardly of the connection of said lever with the associated shiftable member to render the other end of said lever effective for moving its associated shiftable member, said pivot members lying in said plane when said shiftable members are in neutral position, and means for selectively engaging said pivot members with said lever, said two means comprising a pair of rocking members one of which is a shaft and the other of which is a sleeve surrounding said shaft.

11. The combination with a transmission having a pair of members shiftable in opposite directions from neutral position for providing different gear ratios, of a floating lever connected to said shiftable members at spaced points lying in a plane transversely of said shiftable members when the latter are in neutral position, a rock shaft having an actuating crank engageable with said lever intermediate the ends thereof, a pair of pivot members arranged outwardly and in the transverse plane of said spaced points when said shiftable members are in neutral position, and means for selectively engaging either of said pivot members with said lever and releasing the other pivot member from said lever, said means comprising a sleeve surrounding said rock shaft concentric therewith and adapted to rock with respect thereto.

JOHN X. PHILLIPS.